US012786781B2

(12) United States Patent
Patil et al.

(10) Patent No.: US 12,786,781 B2
(45) Date of Patent: Nov. 3, 2026

(54) SYSTEMS AND METHODS FOR L4S-ENABLEMENT IN WIRELESS NETWORKS

(71) Applicant: Verizon Patent and Licensing Inc., Basking Ridge, NJ (US)

(72) Inventors: Sudhakar Reddy Patil, Flower Mound, TX (US); Ravi Potluri, Coppell, TX (US); Jin Yang, Orinda, CA (US); Violeta Cakulev, Millburn, NJ (US); Ye Huang, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 334 days.

(21) Appl. No.: 18/475,595

(22) Filed: Sep. 27, 2023

(65) Prior Publication Data

US 2025/0106680 A1 Mar. 27, 2025

(51) Int. Cl.
*H04W 28/02* (2009.01)
*H04W 8/18* (2009.01)

(52) U.S. Cl.
CPC ......... *H04W 28/0268* (2013.01); *H04W 8/18* (2013.01); *H04W 28/0263* (2013.01)

(58) Field of Classification Search
CPC ...... H04M 15/57; H04M 15/66; H04M 15/00; H04L 12/1407; H04L 47/2408; H04L 65/1016; H04L 65/1069; H04L 65/1073; H04L 65/1104; H04L 65/4061; H04L 65/80; H04L 12/14; H04W 28/0268; H04W 4/10; H04W 12/08; H04W 28/0231; H04W 28/0252; H04W 28/0284; H04W 28/06; H04W 28/0967; H04W 28/12; H04W 28/24; H04W 4/24; H04W 4/90; H04W 48/16; H04W 72/02; H04W 72/1268; H04W 72/1273; H04W 76/10; H04W 76/11; H04W 76/22; H04W 76/50; H04W 8/005; H04W 84/042; H04W 28/02; H04W 72/12; H04W 8/00; H04W 28/0263; H04W 8/18
USPC .......................................................... 370/329
See application file for complete search history.

(56) References Cited

U.S. PATENT DOCUMENTS

| | | | | |
|---|---|---|---|---|
| 11,356,380 | B1 * | 6/2022 | White | H04L 47/626 |
| 12,363,043 | B2 * | 7/2025 | Mate | H04L 65/65 |
| 12,413,653 | B1 * | 9/2025 | Yi | H04L 69/161 |
| 12,513,084 | B1 * | 12/2025 | Yi | H04L 47/12 |
| 2024/0155418 | A1 * | 5/2024 | Lee | H04W 28/0268 |
| 2024/0224114 | A1 * | 7/2024 | Watts | H04W 28/0284 |

(Continued)

FOREIGN PATENT DOCUMENTS

| | | | | |
|---|---|---|---|---|
| EP | 4387286 | A1 * | 6/2024 | H04W 4/38 |
| EP | 4615045 | A1 * | 9/2025 | H04W 28/0268 |

(Continued)

*Primary Examiner* — Nathan S Taylor

(57) ABSTRACT

Systems and methods are provided to enable mobile network operators to dynamically determine when a Low-Latency, Low-Loss Scalable-Throughput (L4S) service shall be enabled for a data flow. A network device in a core network receives a request for a Quality of Service (QoS) flow associated with a user equipment (UE) device; determines whether to enable a LS4 service for the QoS flow; and notifies, based on the determining, a Session Management Function (SMF) to create the QoS flow with L4S service enabled.

20 Claims, 6 Drawing Sheets

(56) References Cited

U.S. PATENT DOCUMENTS

2024/0236765 A1* 7/2024 Xu .................... H04W 28/0268
2024/0275887 A1* 8/2024 Guo .................. H04W 28/0268
2024/0276195 A1* 8/2024 Wong .................... H04W 60/04
2024/0276222 A1* 8/2024 Colom Ikuno ..... H04W 12/069
2024/0276313 A1* 8/2024 Wong .................... H04W 76/30
2024/0276563 A1* 8/2024 Wong .................... H04W 60/04
2024/0284238 A1* 8/2024 Rossbach .......... H04W 28/0252
2024/0291765 A1* 8/2024 Potluri .................. H04L 47/263
2024/0373285 A1* 11/2024 Cai ................... H04W 28/0289
2024/0373286 A1* 11/2024 Fang ....................... H04L 47/30
2024/0373448 A1* 11/2024 Fang ....................... H04L 47/11
2024/0381160 A1* 11/2024 Fang ..................... H04W 24/02
2024/0381171 A1* 11/2024 Vaidya .............. H04W 28/0268
2024/0388989 A1* 11/2024 Sahin ..................... H04W 40/02
2024/0414582 A1* 12/2024 Taneja .............. H04W 28/0268
2025/0008367 A1* 1/2025 Sahin ................ H04W 28/0289
2025/0039092 A1* 1/2025 Panigrahi ................ H04L 47/31
2025/0039736 A1* 1/2025 Panigrahi .......... H04W 28/0289
2025/0048176 A1* 2/2025 Pan .......................... H04L 47/33
2025/0081028 A1* 3/2025 Huang .................. H04W 28/18
2025/0088464 A1* 3/2025 Taneja .............. H04W 28/0268
2025/0203449 A1* 6/2025 Ke .................... H04W 28/0268
2025/0227548 A1* 7/2025 Talebi Fard ...... H04W 28/0268
2025/0227549 A1* 7/2025 Ke .................... H04W 28/0284
2025/0274806 A1* 8/2025 Talebi Fard ...... H04W 28/0289
2026/0006108 A1* 1/2026 Yi ......................... H04L 69/161
2026/0012847 A1* 1/2026 Rossbach .......... H04W 28/0278
2026/0089103 A1* 3/2026 Rossbach ................ H04L 47/11
2026/0101235 A1* 4/2026 Lee ....................... H04W 28/02

FOREIGN PATENT DOCUMENTS

WO WO-2024013385 A1 * 1/2024 ............ H04W 72/21
WO WO-2024013545 A1 * 1/2024 ............. H04L 47/50
WO WO-2025010214 A1 * 1/2025 ........ H04W 28/0289

* cited by examiner

SYSTEMS AND METHODS FOR L4S-ENABLEMENT IN WIRELESS NETWORKS

BACKGROUND INFORMATION

Wireless communication service providers continue to develop and expand available services and their delivery networks. Data-intensive applications like augmented reality (AR), virtual reality (VR), cloud gaming, and video conferencing demand very low communication latency. Next generation networks, such as Fifth Generation (5G) and Sixth Generation (6G) mobile networks, are incorporating a variety of technologies to meet demands for network efficiency and performance. However, certain Internet protocols, such as Transmission Control Protocol (TCP) congestion control algorithms, prevent full realization of these mobile network improvements.

DETAILED DESCRIPTION

Figure 1:
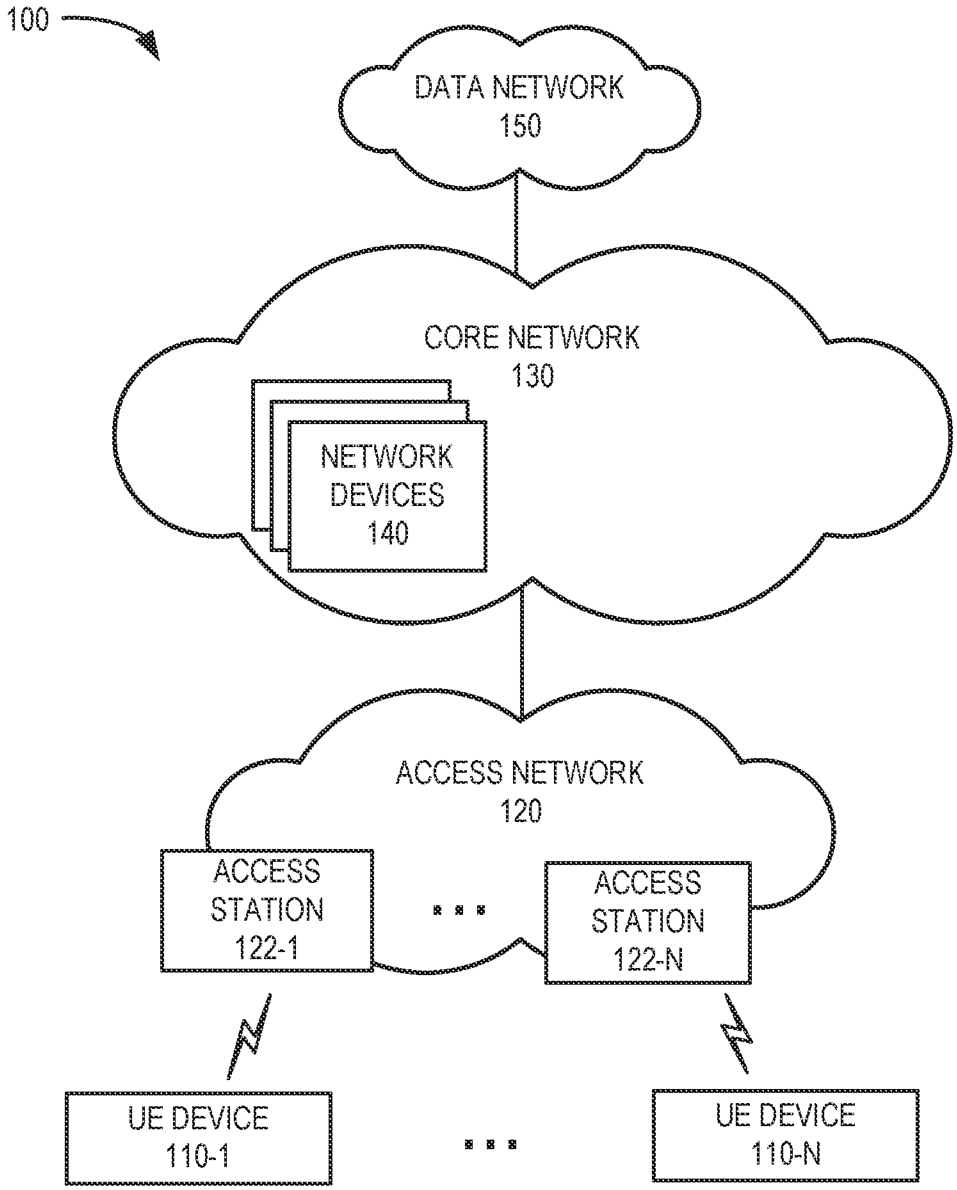
FIG. 1 illustrates an example environment in which systems and methods described herein may be implemented.

The following detailed description refers to the accompanying drawings. The same reference numbers in different drawings may identify the same or similar elements.

Systems and methods described herein enable a mobile network to determine when Low-Latency, Low-Loss Scalable-Throughput (L4S) service may be enabled for a data flow. L4S is a technology to reduce latency in networks. L4S addresses queue delay problems that are particularly relevant to Transmission Control Protocol (TCP), by relying on Explicit Congestion Notification (ECN). ECN is a mechanism that marks packets to signal congestion in the network, preventing packets from being dropped. Senders are expected to respond to this congestion marking by adapting the transmission rate, avoiding the possibility of buffering in the network.

The L4S architecture may include three main components: (a) network support to isolate L4S traffic from classic traffic and to provide appropriate congestion signaling to both types of traffic; (b) protocol features that allow network elements to identify L4S traffic and allow for communication of congestion signaling; and (c) host (e.g., application) support for immediate congestion signaling with an appropriate congestion response that enables scalable performance. Implementations described herein are directed to network support for enabling L4S service. From a network service provider standpoint, L4S may be considered a premium service that provides lower latency to specific traffic. Enabling L4S service for all traffic is not currently feasible due to incomplete adaptation of L4S at the end-device/host level, such as user equipment (UE) operating systems (OS) and application servers. Furthermore, in some instances, L4S service may need to be enabled based on application server requests to the network (in contrast with, for example, a request from a UE), which is not currently supported.

According to an implementation, a network device (e.g., a Policy Control Function (PCF) device) in a mobile network may determine to enable L4S service for a specific subscriber and data flow (e.g., also referred to herein as a quality of service (QOS) flow) based on a subscription as well as capabilities of the corresponding UE device and server device. In one implementation, core network devices may dynamically enable the L4S marking capability in a radio access network (RAN) based on the foregoing determination. In another implementation, core network devices may enable L4S marking in a transport/backhaul network through selection of a tunnel (e.g., a General Packet Radio Service (GPRS) Tunneling Protocol (GTP) tunnel) or virtual local area network (VLAN). According to another implementation, the mobile network may support L4S for a specific set of groups or services, identified by QoS flow, as well as a subscriber's UE identifiers (subscriber profile identifier (SPID)/radio access technology (RAT) frequency selection priority (RFSP)), and network identifications, such as a network slice identifier.

FIG. 1 is a diagram illustrating an exemplary environment 100 in which systems and methods described herein may be implemented. Referring to FIG. 1, environment 100 includes UE devices 110-1 through 110-N, access network 120, access stations 122-1 through 122-N, core network 130, network devices 140, and data network 150.

UE devices 110-1 through 110-N (referred to herein individually as UE device or UE 110, and collectively as UE devices or UEs 110) may include any computing device, such as a personal computer (PC), a laptop computer, a server, a tablet computer, a notebook, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, an Internet of Things (IoT) device, a machine type communication (MTC) device, etc., that includes communication functionality. UE device 110 may connect to access network 120 via access station 122-1 and UE device 110-N may connect to access network 120 via Access station 122-N. UE devices 110 may also connect to other devices in environment 100 via other techniques, such as techniques for establishing wired, wireless, optical connections or a combination of these techniques. UE device 110 and a person that may be associated with UE device 110 (e.g., the party holding or using UE device 110) may be referred to collectively as UE device 110 or UE 110 in the description below.

Access network 120 may provide access to core network 130 for wireless devices, such as UE devices 110. Access network 120 may enable UE device 110 to connect to core network 130 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 130, a service or application layer network, a cloud network, a multi-access edge computing (MEC) network, a fog network, etc. Furthermore, access network 120 may enable a device in core network 130 to exchange data with UE device 110 using a non-IP data delivery method such as Data over Non-Access Stratum (DoNAS).

Access network 120 may also include a Fifth Generation (5G) access network or another advanced network, such as a Fourth Generation (4G) Long Term Evolution (LTE) access network. For example, access network 120 may include the functionality of a 5G network, such as 5G Radio Access Network (RAN) communicating via mmWave technology, a 5G RAN communicating via C-band technology or other types of 5G networks. Access network 120 may also include a 4G RAN.

Access stations 122 (referred to collectively as access stations 122 and individually as access station 122) may be included in access network 120. Access station 122 may include a 5G New Radio (NR) base station (e.g., a gNodeB) and/or a Fourth Generation (4G) Long Term Evolution (LTE) base station (e.g., an eNodeB). According to an implementation, an access station 122 may include a gNodeB or its equivalent with multiple distributed components, such as a central unit (CU), a distributed unit (DU), a remote unit (RU or a remote radio unit (RRU)), or another type of component to support distributed arrangements. Each access station 122 may include devices and/or components configured to enable cellular wireless communication with UE device 110. For example, access station 122 may include a radio frequency (RF) transceiver configured to communicate with UE devices using a 5G NR air interface, a 4G LTE air interface, and/or using another type of cellular air interface.

Core network 130 may include one or more wired, wireless, and/or optical networks that are capable of receiving and transmitting data (e.g., voice and/or video) and signals. In an exemplary implementation, core network 130 may be associated with a telecommunications service provider (e.g., a service provider providing cellular wireless communication services and wired communication services) and may manage communication sessions of UE devices 110 connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE or LTE Advanced network, a sixth generation (6G) network, and/or a legacy core network. Core network 130 may provide packet-switched services and wireless Internet Protocol (IP) connectivity to various components in environment 100, such as UE devices 110, to provide, for example, data, voice, and/or multimedia services.

Core network 130 may include various network devices 140. Depending on the implementation, network devices 140 may include 5G core network components (e.g., a User Plane Function (UPF), an Access and Mobility management Function (AMF), a Session Management Function (SMF), a Unified Data Management (UDM), a Unified Data Repository (UDR), a Policy Control Function (PCF), an Authentication Server Function (AUSF), a Charging Function (CHF), a Network Exposure Function (NEF), an application function (AF), etc.), 4G core network components, or another type of core network components (e.g., future 6G network components). In other implementation, network devices 140 may include combined 4G and 5G functionality, such as a session management function with Packet Data Network (PDN) Gateway-control plane (SMF+PGW-C) and a user plane function with PGW-user plane (UPF+PGW-U).

Data network 150 may include, for example, a packet data network. In an exemplary implementation, UE device 110 may connect to data network 150 via core network 130. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

Network environment 100 may be configured to support a variety of traffic, such as traffic between a UE 110 and data network 150. According to implementations described herein, one or more networks or network segments, may support Explicit Congestion Notification (ECN) used for the L4S service. ECN/L4S may be set up with a negotiation process between endpoints (e.g., a UE device 110 and an application server, which may be in data network 150). L4S markings may be carried in IP packet headers. Once a QoS flow with L4S service is set up, ECN-capable nodes may monitor for congestion and report, via ECN bits in the IP header, when congestion is detected at a network node. According to implementations described herein, network devices in core network 130 may determine when or if the L4S service can be used for a particular QoS flow and provide parameters to define which nodes/network segments in access network 120 and/or core network 130 will provide congestion monitoring and markings for the L4S service.

The exemplary configuration illustrated in FIG. 1 is provided for simplicity. A typical environment may include more or fewer devices than illustrated in FIG. 1. For example, environment 100 may include a large number (e.g., thousands or more) of UE devices 110 and access stations 122, as well as multiple access networks 120, core networks 130 and data networks 150. Environment 100 may also include elements such as gateways, monitoring devices, network functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
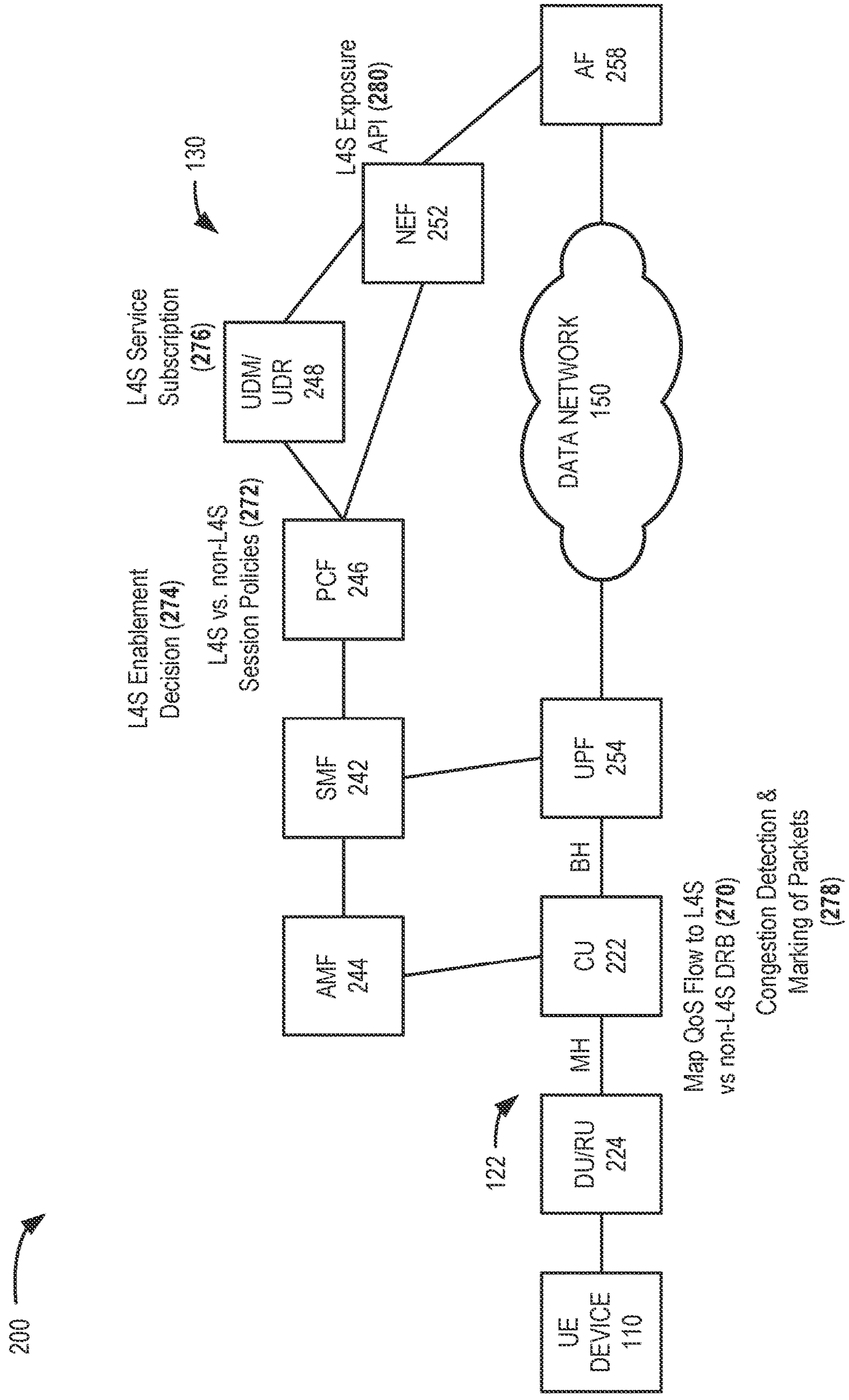
FIG. 2 is a block diagram of components implemented in the environment of FIG. 1, in accordance with an implementation.

FIG. 2 illustrates a portion 200 of environment 100, including certain elements in access network 120 and core network 130, in accordance with an implementation. Referring to FIG. 2, network devices 140 in core network 130 include SMF 242, AMF 244, PCF 246, a UDM and/or a UDR 248 (referred to herein as UDM/UDR 248), NEF 252, and UPF 254. Core network 130 may include other elements/functions and/or differently arranged elements. Network portion 200 also includes UE device 110, access station 122 (depicted as a CU 222 and DU/RU 224), and an application function 258. As illustrated in FIG. 2, UE device 110 may connect to core network 130 via access station 122.

CU 222 and DU/RU 224 may include portions of access station 122, such as a gNodeB. CU 222 may connect with core network 130 (e.g., UPF 254) via a backhaul ("BH") transport domain. CU 222 may connect with DU/RU 224 via a midhaul ("MH") transport domain located, for example, in far edge network. The BH and MH transport domains may include intermediate links (not shown). In some implementations, the DU and RU of DU/RU 224 may be connected by a fronthaul ("FH") transport domain (not shown). CU 222 may receive instructions from AMF 244 regarding enabling L4S service. For example, CU 222 may be directed to map a QoS flow to a L4S or non-L4S dedicated radio bearer (DRB), as indicated at reference 270. Upon initiation of L4S service for a flow, CU 222 may perform congestion detection and marking of packets (reference 278).

SMF 242 may perform session establishment, session modification, and/or session release; perform IP address allocation and management; perform Dynamic Host Configuration Protocol (DHCP) functions; perform selection and control of a UPF (not shown); configure traffic steering at the UPF to guide the traffic to the correct destinations; terminate interfaces toward PCF 246; perform lawful intercepts; charge data collection; support charging interfaces; control and coordinate charging data collection; terminate session management parts of NAS messages; perform downlink data notification; manage roaming functionality; and/or perform other types of control plane processes for managing user plane data. According to implementations described herein, SMF 242 may notify access station 122 (e.g., CU 222) via AMF 244 to create the QoS flow and enable L4S marking. SMF 242 may also instruct UPF 254 to enable L4S marking.

AMF 244 may perform registration management, connection management, reachability management, mobility management, lawful intercepts, Short Message Service (SMS) transport between UE device 110 and other network functions; session management messages transport between UE device 110 and SMF 242, access authentication and authorization, location services management, functionality to support non-3GPP access networks, and/or other types of management processes.

PCF 246 may support policies to control network behavior, provide policy rules to control plane functions (e.g., to SMF 242), access subscription information relevant to policy decisions, perform policy decisions, and/or perform other types of processes associated with policy enforcement. According to systems and methods described herein, PCF 246 may store/access L4S policies and non-L4S policies (i.e., policies 272) that may be applied to a session or QoS flow. PCF 246 can make decisions (i.e., L4S enablement decision 274) to use L4S on a QoS flow based on factors including, a subscription to L4S, UE 110 operating system capability (if known), application function 258's L4S adaptiveness (e.g., based on monitoring of responsiveness to congestion marking), specific requests from NEF 252, and/or the subscriber's spending limits. Upon a positive determination to use L4S, PCF 246 may notify SMF 242 to create a QoS Flow and enable the L4S service.

UDM/UDR 248 may maintain subscription information for UE devices 110, manage subscriptions, generate authentication credentials, handle user identification, perform access authorization based on subscription data, perform network function (NF) registration management, maintain service and/or session continuity by maintaining assignment of SMF 242 for ongoing sessions, and/or perform other processes associated with managing user data. According to implementations described herein, UDM/UDR 248 may provide L4S service subscription data (i.e., L4S service subscription 276) to PCF 246, for example, as part of a UE registration process.

NEF 252 may expose network component capabilities and events internal to corresponding core network 130 and/or data networks 150 to devices and network functions external to network 130. Furthermore, NEF 252 may secure provisioning of information from external applications to core network 130, translate information between core network 130 and devices/networks external to core network 130, support a Packet Flow Description (PFD) function, and/or perform other types of network exposure functions. According to an implementation, NEF 252 may provide an application programming interface (API, i.e., L4S Exposure API 280) to receive L4S requests from application function 258. Upon receiving an L4S request, NEF 252 may store information in UDM/UDR 248 and/or invoke PCF 246 to dynamically initiate L4S service in a QOS flow.

UPF 254 may maintain an anchor point for intra/inter-radio access technology (RAT) mobility (e.g., mobility across different radio access technologies); maintain an external Packet Data Unit (PDU) point of interconnect to a data network (e.g., an IP network, etc.); perform packet routing and forwarding; perform the user plane part of policy rule enforcement; perform packet inspection; perform lawful intercept; perform traffic usage reporting; perform QoS handling in the user plane; perform uplink traffic verification; perform transport level packet marking; perform downlink packet buffering; send and forward an "end marker" to a RAN node (e.g., access station 122); and/or perform other types of user plane processes. According to an implementation, a user plane (UP) tunnel (e.g., a GTP User Plane (GTP-U) tunnel) may carry a QoS flow between access station 122 and UPF 254. UPF 254 and access station 122 may also use specific VLAN or tunnel IP addresses to indicate on what flows to enable L4S marking.

Application function 258 (also referred to as an application server, or simply an application) may provide services for a program or an application running on UE device 110 and may establish communication sessions with UE device 110 via core network 130. Application function 258 may generally be considered outside of (e.g., not part of) core network 130. Application function 258 may be included within data network 150 or outside of data network 150 (as shown in FIG. 2). According to implementations described herein, AF 258 may use APIs available through NEF 252 to identity user groups designated for L4S service. For example, AF 258 may identify a set of groups or services designated for L4S service, such as a group of UE devices (e.g., a list of SPIDs, RFSPs, etc.) associated with a QoS flow and/or network slice.

Based on the instructions from SMF 242, access station 122, UPF 254, and any selected transport domain devices/components may monitor a QoS flow and, if there is congestion in those domains, the devices/components may mark the traffic with congestion indications. These indications may then be utilized by the application function 258 and/or UE 110 to shape the application traffic.

Network portion 200 illustrated in FIG. 2 may include additional elements and/or NFs that are not illustrated. Such elements and/or NFs may provide security, authentication and authorization, network polices, subscriber profiles, network slicing, and/or facilitate the operation of core network 130. It should also be understood that functions described as being performed by various elements in FIG. 2, including elements in core network 130, may be performed by other elements/functions in other implementations.

Figure 3:
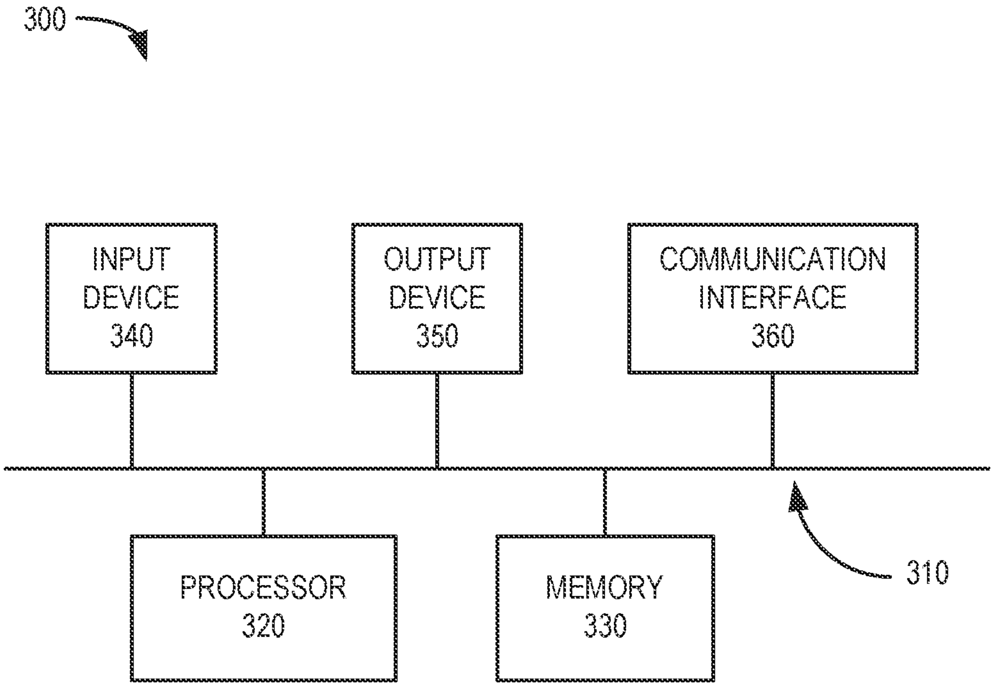
FIG. 3 illustrates logic components implemented in one or more of the devices described herein in accordance with an exemplary implementation.

FIG. 3 illustrates an exemplary configuration of a device 300. One or more devices 300 may correspond to or be included in devices in environment 100, such as UE device 110, access station 122, network devices 140 (e.g., SMF 242, AMF 244, PCF 246, UDM/UDR 248, NEF 252, and UPF 254), application function 258, and other devices included in environment 100. Referring to FIG. 3, device 300 may include bus 310, processor 320, memory 330, input device 340, output device 350 and communication interface 360. The exemplary configuration illustrated in FIG. 3 is provided for simplicity. Device 300 may include more or fewer components than illustrated in FIG. 3.

Bus 310 may provide communication paths between components of device 300. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. For example, the instructions may support dynamic enablement of L4S service as described herein. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
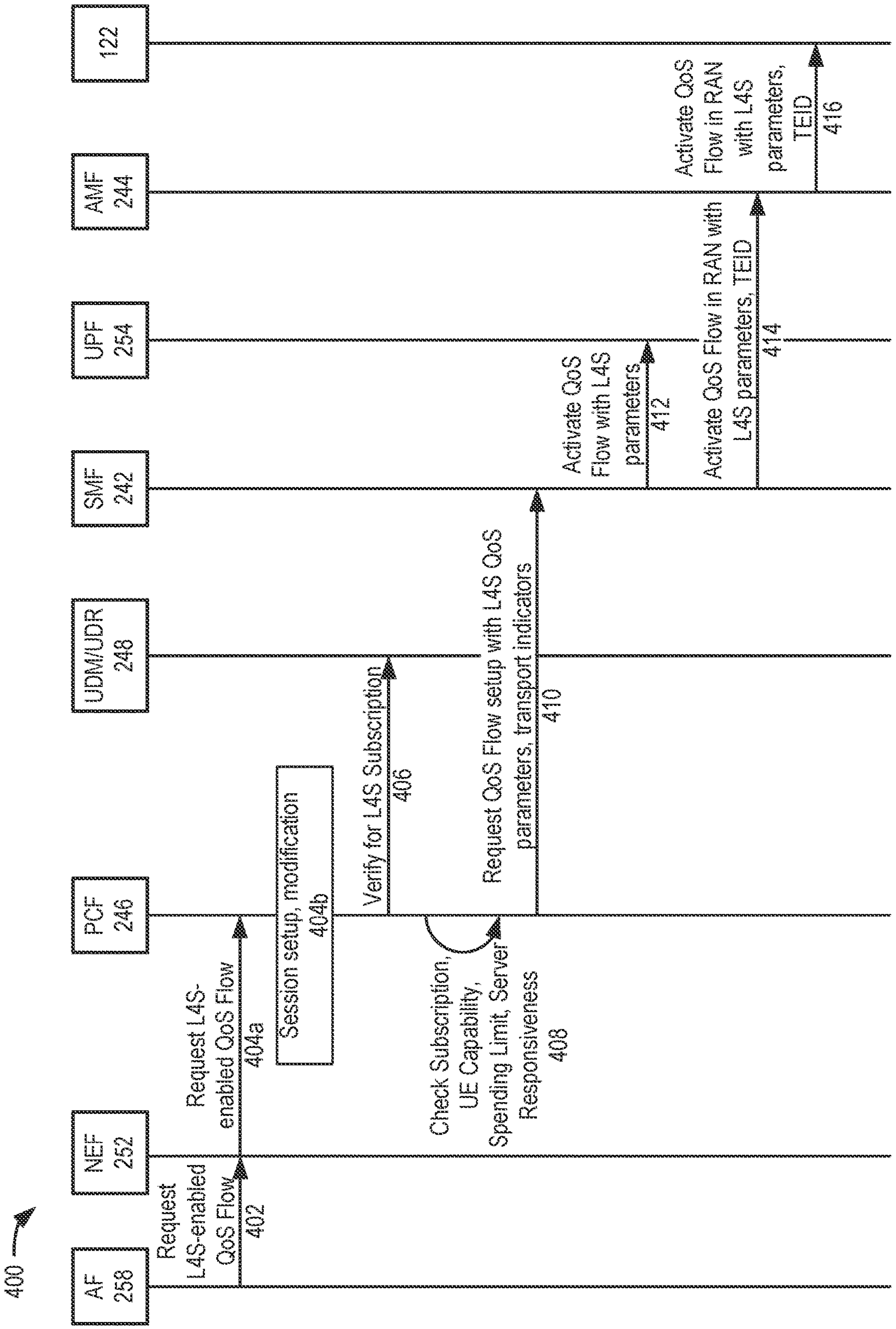
FIG. 4 is a signal flow diagram illustrating enablement of Low-Latency, Low-Loss Scalable-Throughput (L4S) service, according to an implementation.

FIG. 4 is a signal flow diagram illustrating signals for enablement of L4S in a portion 400 of network environment 100. Network portion 400 may include SMF 242, AMF 244, PCF 246, UDM/UDR 248, NEF 252, UPF 254, and AF 258.

A decision to enable L4S for a QoS flow may be initiated in at least two different ways. As shown in FIG. 4, in one implementation, AF 258 may request an L4S-enabled QoS flow through NEF 252 (e.g., via an API), as indicated at signal 402. For example, AF 258 may identify a set of groups or services designated for L4S service, such as a group of UE devices (e.g., SPIDs, RFSPs, etc.) associated with a QoS flow and/or network slice. NEF 252 may forward the request for the L4S-enabled QoS flow to PCF 246, as indicated at signal 404*a*. The request from AF 258 may indicate that L4S should be provided for the specific set of groups or services, identified by QoS flow and UE device, for example. In another implementation, also shown in FIG. 4, a decision for an L4S-enabled QoS flow may be triggered by PCF 246 as part of a session set-up or session modification for a UE 110 (not shown in FIG. 4), as indicated at signal 404*b*.

In response to either signal 404*a* or 404*b*, PCF 246 may query UDM/UDR 248 to verify that a UE has a subscription for L4S (signal 406). PCF 246 may then check the subscription, determine whether UE 110 has the capability to support L4S, review if any subscription spending limits are in place, and review server responsiveness metrics that may indicate whether AF 258 can support L4S (reference 408). Determining by PCF 246 whether to enable L4S is described further in connection with FIG. 6, for example. PCF 246 may determine whether L4S is able to be provided and whether L4S is appropriate for all or part of a QoS flow. For example, PCF 246 may decide to activate L4S over a RAN (e.g., access network 120) or both a RAN and a transport network (e.g., core network 130).

Assuming PCF 246 determines to activate L4S for the QoS flow, PCF 246 may activate L4S with the QoS flow over the RAN or both the RAN and the transport network. To activate the QoS flow with L4S, PCF 246 may send a message to SMF 242 to activate the QoS flow with the L4S QoS parameters and transport indicators (e.g., RAN-only, RAN+transport network, etc.) (signal 410). L4S QoS parameters may define queue limits (e.g., that indicate congestion at network nodes), marking requirements, etc. Transport indicators may identify network segments (RAN, transport, etc.) where L4S will be implemented. For example, signal 410 may indicate to SMF 242 that the L4S service is to be enabled for a flow in the transport domain, or that the L4S service is to be enabled for a flow based on specific design option, such as a Tunnel IP address or virtual local area network (VLAN) address.

SMF 242 may receive the activation message from PCF 246. To activate the QoS flow with L4S over the transport network, SMF 242 may send a message to UPF 254 to enable the QoS flow with the L4S marking (signal 412). The message to UPF 254 may include QoS parameters and the transport indicators. To activate the QoS flow with L4S over the RAN, SMF 242 may send a message to AMF 244 to enable the QoS flow with the L4S marking (signal 414). The message to AMF 244 may include the L4S QoS parameters, a tunnel endpoint identifier (TEID), and the transport indicators (signal 414). AMF 244 may forward the L4S instructions to wireless station 122 for implementation (signal 416).

Upon receiving signal 412, UPF 254 may monitor the QOS flow and, if there is congestion in the transport domain, UPF 254 may mark the traffic with congestion indications. Similarly, upon receiving signal 416, access station 122 may monitor the QOS flow and, if there is congestion in the RAN domain, access station 122 may mark the traffic with congestion indications. These indications may then be utilized by the application (e.g., executing on UE 110 and AF 258) to shape the application traffic.

Figure 5:
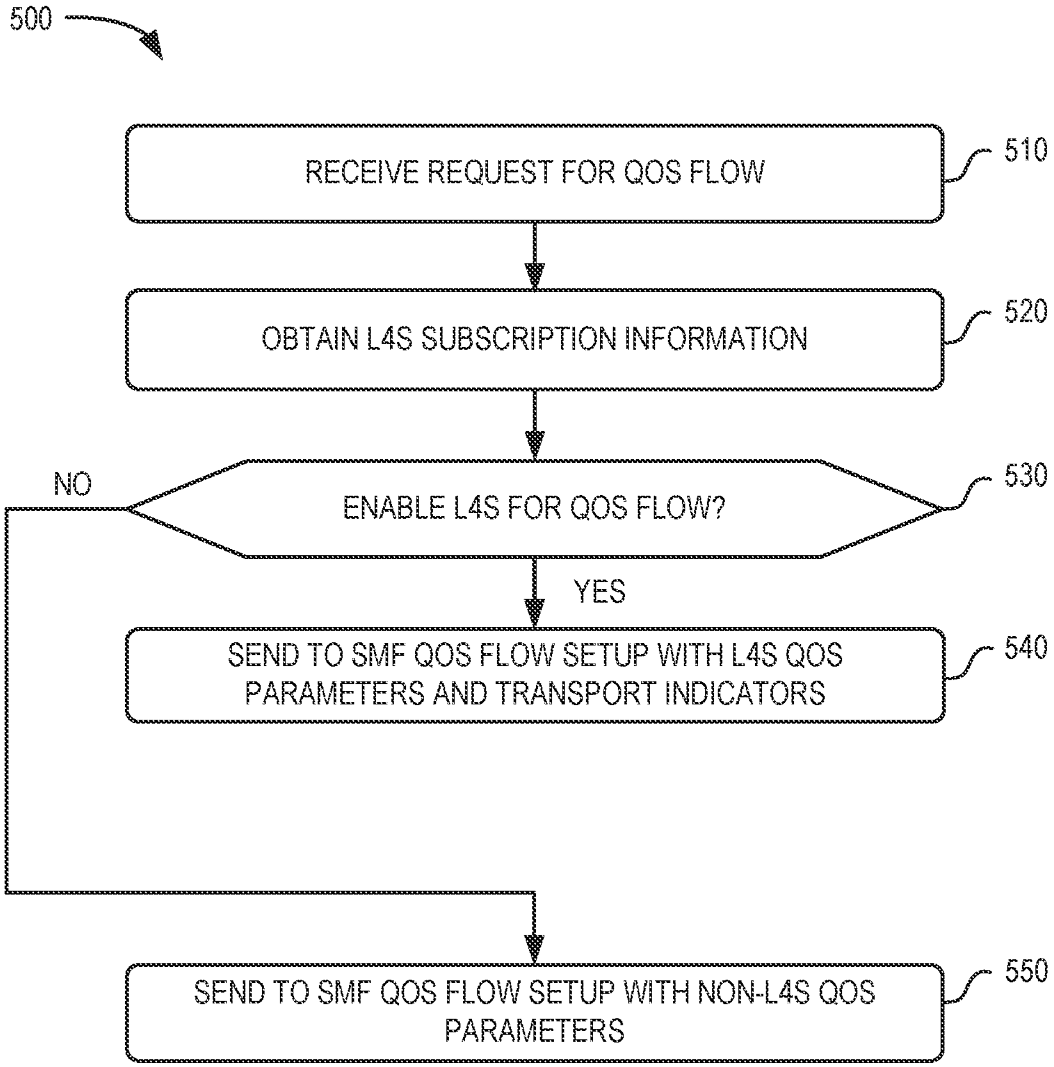
FIGS. 5 and 6 are flow diagrams illustrating a process for enabling L4S service, in accordance with an implementation.
Figure 6:
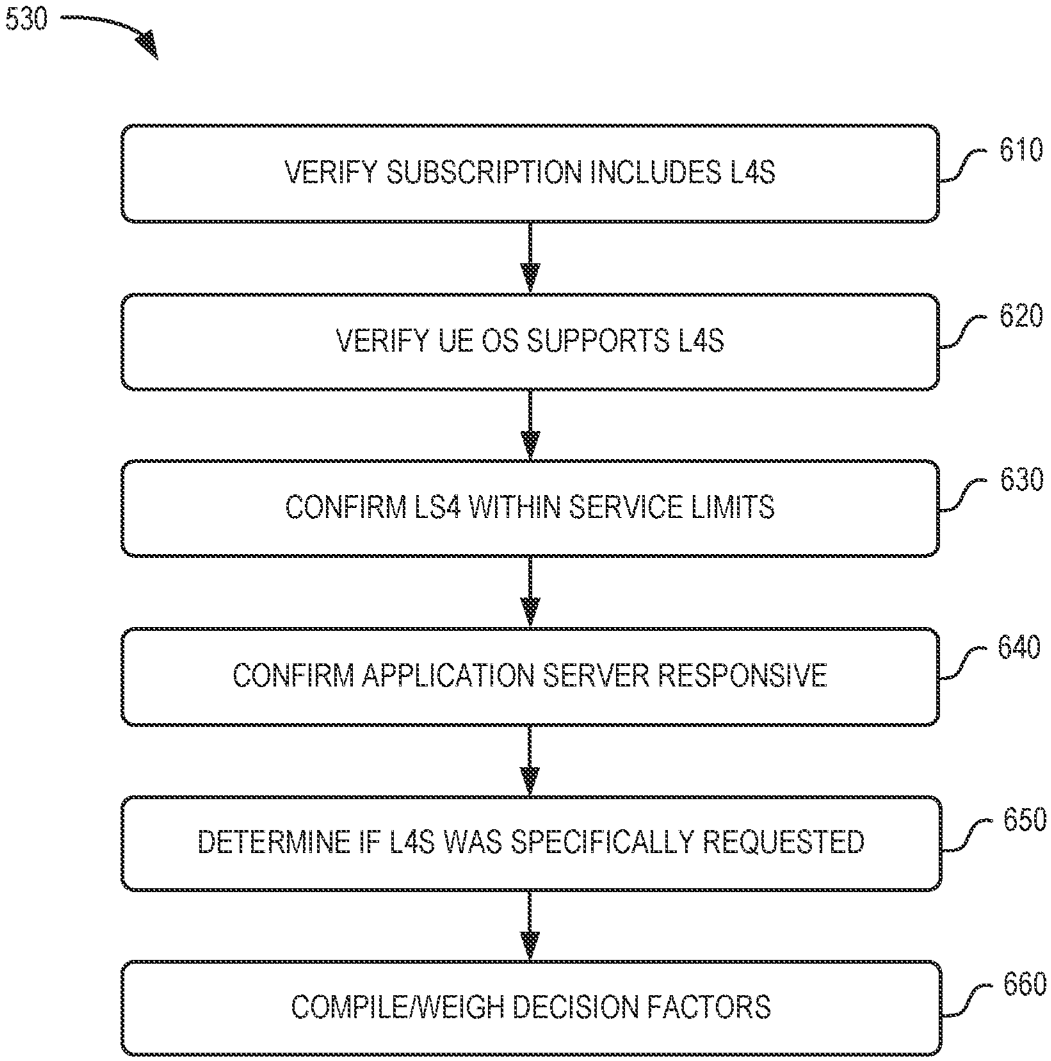

FIGS. 5 and 6 are flow diagrams illustrating a process 500 associated with enabling L4S service, in accordance with an implementation. According to an implementation, process 500 may be performed, for example, by PCF 246. In other implementations, process 500 may be performed by PCF 246 in conjunction with one or more other devices of network portion 200.

Process 500 may include receiving a request for a QoS flow (block 510) and obtaining L4s subscription information (block 520). For example, as described in connection with FIG. 4, AF 258 may submit to PCF 246 (via NEF 252) a request for an L4S-enabled QoS flow. Alternatively, an L4S-enabled QoS flow decision may be triggered by PCF 246 as part of a session set-up or session modification for UE 110. In response to either the request from AF 258 or the new/modified session request, PCF 246 may query UDM/UDR 248 for L4S subscription status from a subscriber's profile.

Process 500 may also include determining whether to enable L4S for the QoS flow (block 530). For example, PCF 246 may apply a variety of factors to determine if L4S can be effectively applied for the requested QoS session. Factors for determining whether to enable L4S (i.e., are described further in connection with FIG. 6.

As shown in FIG. 6, determining whether to enable L4S may include verifying that a subscription covers L4S (block 610) and verifying that a UE OS supports L4S (block 620). For example, PCF 246 may identify whether a subscription associated with UE device 110 includes a premium level that include L4S. PCF 246 may also attempt to determine if the OS used by UE device 110 supports L4S. For example, PCF 246 may identify an OS version of UE 110 from a device profile and match the OS version to a list that is known to support L4S.

Determining whether to enable L4S may also include confirming that L4S is with a subscriber's service limits (block 630) and confirming that the application server is responsive (block 640). For example, a subscriber may have certain spending limits (e.g., for premium level services) that may prevent/limit use of L4S if a spending threshold is reached. PCF 246 may confirm (e.g., from a local database or from UDM/UDR 248) that a user's subscription spending threshold allows L4S for a current session (e.g., that current service limits are not exceeded). Also, PCF 246 may retrieve historical records of AF 258's responsiveness to congestion marking. For example, if recent history for AF 258 shows no congestion marking during congestion periods, PCF 246 may determine that AF 258 cannot support L4S. Conversely, PCF 246 may determine that AF 258 can support L4S based on consistent use of congestion marking during previous congestion periods.

Determining whether to enable L4S may also include determining if L4S has been specifically requested (block 650) and compiling and/or weighing the decision factors (block 660). For example, PCF 246 may consider the source of an L4S trigger (e.g., AF 258 via NEF 252, or a session setup request initiated by UE device 110). In determining whether to enable L4S, certain factors in blocks 610-650 may or may not be determinative. For example, if PCF 246 confirms that the current UE OS does not support L4S (e.g., in block 620), PCF 246 may not enable L4S for a QoS flow even if a user has a subscription that includes L4S. As another example, if L4S is specifically requested by AF 258 (e.g., block 650), a UE device 110 without a premium subscription may still be approved to receive LS4 (e.g., assuming an entity associated with AF 258 has a billing arrangement with the service provider of core network 130). In other implementations, one or more factors of blocks 610-650 may be excluded.

Returning to FIG. 5, if L4S is to be enabled (block 530-Yes), process 500 may include sending to an SMF QoS flow setup information with L4S QoS parameters and transport indicators (block 540). For example, assuming PCF 246 decides to enable L4S for a requested QoS flow, PCF 246 may send a QoS flow setup request (e.g., signal 410) to SMF 242. The QoS flow setup request may include L4S QoS parameters (e.g., queue size, marking criteria, etc.) and transport indicators of which network portions (e.g., RAN, transport domain, etc.) will provide the L4S service. Transport indicators may include, for example, a tunnel IP address or a VLAN address. Based on instructions from PCF 246/SMF 242, access station 122, UPF 254, and other network elements in the transport domain may monitor the QOS flow. If there is congestion in the monitored network segment, traffic can be marked with congestion indications (e.g., an explicit congestion notification (ECN) in an IP packet headers). These indications may then be utilized by UE 110 and AF 258 to shape the application traffic and prevent dropped packets.

If L4S is not to be enabled (block 530-Yes), process 500 may include sending, to an SMF, QOS flow setup information with non-L4S QoS parameters (block 550). For example, PCF 246 may send non-L4S (classic) QoS parameters for SMF 242 to initiate a QoS flow.

Systems and methods are provided to enable mobile network operators to dynamically determine when a L4S service is to be enabled for a data flow. A network device (e.g., a PCF or similar function) in a core network may receive a request for a QoS flow associated with a user equipment (UE) device; determine whether to enable a LS4 service for the QoS flow; and notify, based on the determining, a Session Management Function (SMF) to create the QoS flow with L4S service enabled.

The foregoing description of example implementations provides illustration and description but is not intended to be exhaustive or to limit the embodiments to the precise form disclosed. Modifications and variations are possible in light of the above teachings or may be acquired from practice of the embodiments.

For example, features have been described above with PCF 246 generating a L4S enablement decision based on provisioned policy and information provided other network functions. In other implementations, other network functions/elements or variations of network functions (e.g., a split core PCF) may provide a L4S enablement decision.

In addition, features have been described with respect to generating L4S enablement decisions using elements in core network 130. In other implementations, similar processing may be performed in other portions of environment 100, such as in a Multi-access Edge Computing (MEC) platform located, for example, between access network 120 and core network 130. In still other implementations, a number of PCFs 246 may be distributed in environment 100 to generate L4S enablement decisions, as described above.

Further, while a series of signal flows have been described with respect to FIG. 4 and a series of acts with respect to FIGS. 5 and 6, the order of the acts and signal flows may be different in other implementations. Moreover, non-dependent acts may be implemented in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a network device in a core network, a request for a Quality of Service (QOS) flow associated with a user equipment (UE) device;

determining, by the network device, whether to enable a Low-Latency, Low-Loss Scalable-Throughput (L4S) service for the QoS flow and whether all or part of the QoS flow is appropriate for the L4S service, wherein the determining includes:

identifying whether the UE device supports the L4S service, and identifying if an application function associated with the QoS flow has historically supported congestion marking for L4S services; and notifying, by the network device and based on the determining, a Session Management Function (SMF) to create the QoS flow with the L4S service enabled, wherein the notifying includes providing a transport indicator identifying which portion of a network will provide the L4S service.

2. The method of claim 1, wherein the network device includes a Policy Control Function (PCF) for the core network, and wherein the determining further comprises:

determining whether the L4S service is appropriate for one of a Radio Access Network (RAN) only or the RAN plus a transport network for the QoS flow.

3. The method of claim 1, wherein the determining further comprises:

identifying whether an operating system of the UE device supports the L4S service, or confirming that an application function associated with the QoS flow is responsive to congestion marking for the L4S service.

4. The method of claim 1, wherein the determining further comprises:

verifying that a subscription of the UE device associated with the QoS flow includes the L4S service, and confirming that the L4S service is within current service limits of the subscription.

5. The method of claim 1, wherein the determining further comprises:

verifying that a subscription of the UE device includes the L4S service, or identifying the request as a request from a Network Exposure Function (NEF).

6. The method of claim 1, further comprising:

retrieving, from a data repository function and based on the receiving, subscription information for the UE device associated with the QoS flow.

7. The method of claim 1, further comprising:

notifying, by the SMF, a User Plane Function (UPF) to enable L4S marking for the QoS flow over a transport domain.

8. The method of claim 1, further comprising:

notifying, by the SMF, an access and mobility management function (AMF) to enable L4S marking for the QoS flow over a Radio Access Network (RAN).

9. The method of claim 1, wherein the receiving includes:

receiving, via a Network Exposure Function (NEF), the request from an application function.

10. The method of claim 1, wherein the receiving includes:

receiving a session setup request or a session modification request.

11. The method of claim 1, further comprising:

sending, to the SMF and based on the determining. QoS flow setup information with non-L4S QOS parameters when the L4S service is not available for the QoS flow.

12. The method of claim 1, wherein the transport indicator includes one of a tunnel Internet Protocol (IP) address or a virtual local area network (VLAN) address.

13. A system, comprising:

at least one network device in a core network, the network device configured to:

receive a request for a Quality of Service (QOS) flow associated with a user equipment (UE) device;

determine whether to enable a Low-Latency, Low-Loss Scalable-Throughput (L4S) service for the QoS flow and whether all or part of the QoS flow is appropriate for the L4S service, wherein the determining includes:

identifying whether the UE device supports the L4S service, and identifying if an application function associated with the QoS flow has historically supported congestion marking for L4S services; and notify, based on the determining, a Session Management Function (SMF) to create the QoS flow with L4S service enabled, wherein the notifying includes providing a transport indicator identifying which portion of a network will provide the L4S service.

14. The system of claim 13, wherein the network device includes a Policy Control Function (PCF) for the core network, and wherein, when determining whether to enable the L4S service, the at least one network device is further configured to:

determine whether the L4S service is appropriate for one of a Radio Access Network (RAN) only or the RAN plus a transport network for the QoS flow.

15. The system of claim 13, wherein when determining whether to enable the L4S service, the at least one network device is further configured to:

confirm that an application function associated with the QoS flow is responsive to congestion marking for the L4S service.

16. The system of claim 13, wherein when determining whether to enable the L4S service, the at least one network device is further configured to:

identify whether an operating system of the UE device supports the L4S service.

17. The system of claim 13, wherein when receiving the request, the at least one network device is further configured to:

receive, via a Network Exposure Function (NEF), the request from an application function outside the core network.

18. The system of claim 13, wherein when notifying the SMF, the at least one network device is further configured to:

provide a tunnel Internet Protocol (IP) address or a virtual local area network (VLAN) address for the L4S service.

19. A non-transitory computer-readable medium storing instructions, which are executable by one or more processors, for:

receiving, by a network device in a core network, a request for a Quality of Service (QOS) flow associated with a user equipment (UE) device;

determining, by the network device, whether to enable a Low-Latency, Low-Loss Scalable-Throughput (L4S) service for the whether to enable a Low-Latency, Low-Loss Scalable-Throughput (L4S) service for the QoS flow and whether all or part of the QoS flow is appropriate for the L4S service, wherein the determining includes:

identifying whether the UE device supports the L4S service, and identifying if an application function associated with the QoS flow has historically supported congestion marking for L4S services; and notifying, by the network device and based on the determining, a Session Management Function (SMF) to create the QoS flow with the L4S service enabled, wherein the notifying includes providing a transport indicator identifying which portion of a network will provide the L4S service.

20. The non-transitory computer-readable medium of claim 19, wherein the network device includes a Policy Control Function (PCF), and wherein the instructions for determining further comprise instructions for:

identifying whether an operating system of the UE device supports the L4S service, and confirming that an application function associated with the QoS flow is responsive to congestion marking for the L4S service.

* * * * *